March 2, 1965  R. R. BERLOT  3,172,104
MEASUREMENT OF HYPERSONIC FLIGHT DATA
Filed June 27, 1960
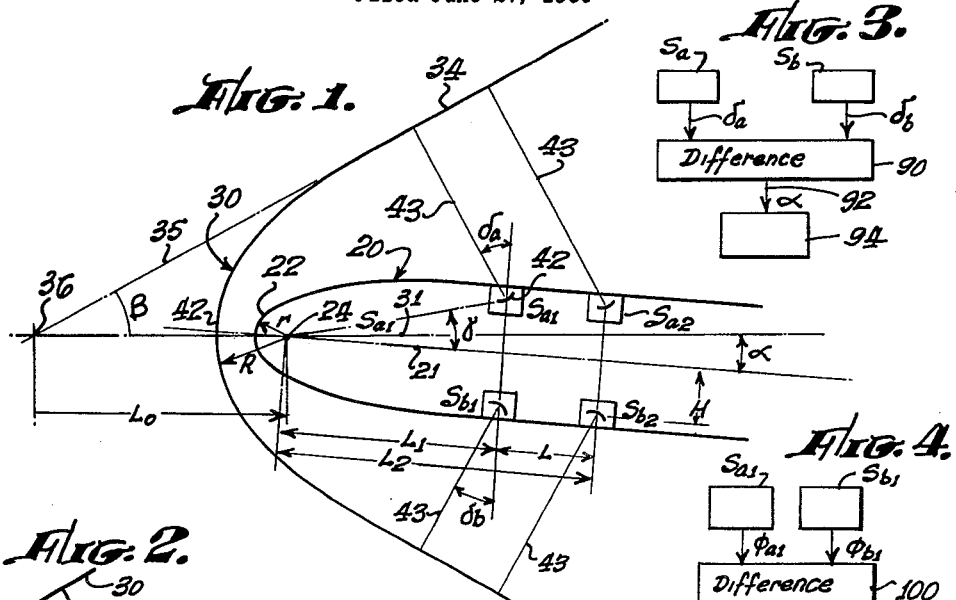
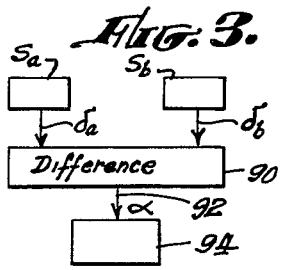
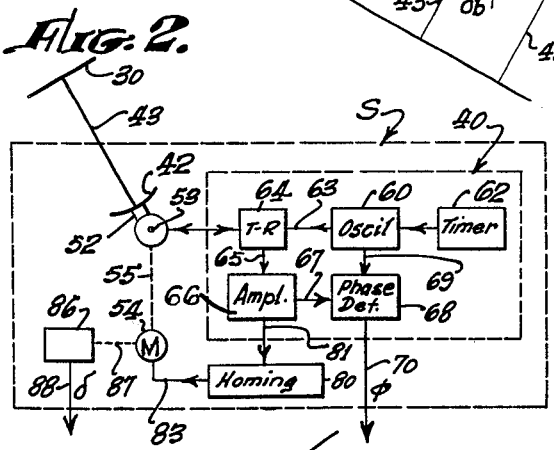
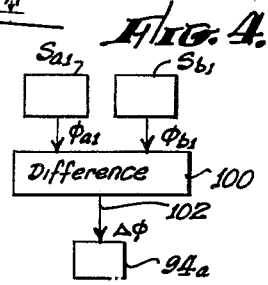
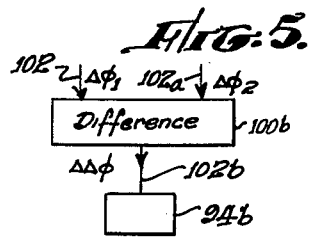
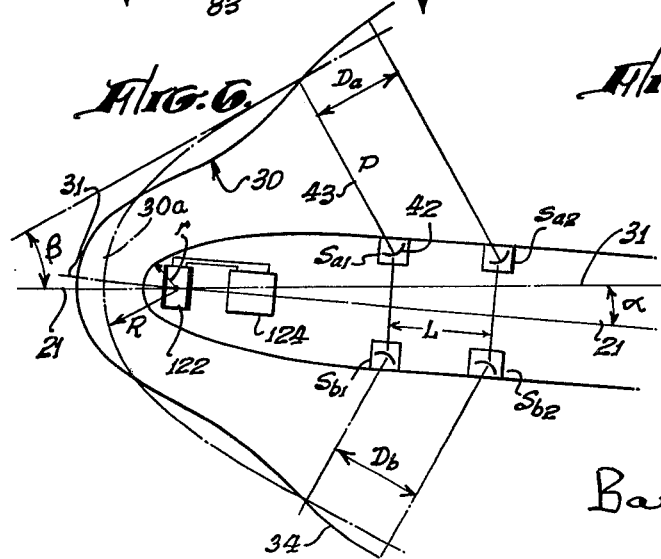
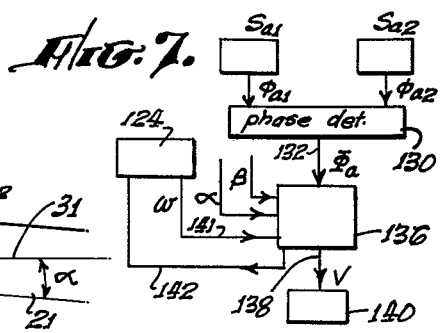
INVENTOR.
ROBERT R. BERLOT,
BY
Barkelew & Lewis United States Patent Office 3,172,104
Patented Mar. 2, 1965

3,172,104
MEASUREMENT OF HYPERSONIC FLIGHT DATA
Robert R. Berlot, Los Angeles, Calif., assignor to Giannini Controls Corporation, Duarte, Los Angeles, Calif., a corporation of New York
Filed June 27, 1960, Ser. No. 39,171
10 Claims. (Cl. 343—8)

This invention is concerned with methods and instrumentation for measuring certain flight variables of vehicles moving at speeds much greater than the velocity of sound. The invention relates particularly to the measurement of velocity and angle of attack.

Conventional airspeed indicators based on the Pitot tube principle are inadequate for hypersonic flow because the shock waves which form about the probe reduce the stagnation pressure by unknown loss factors, and the probe itself is generally destroyed by the heating effect.

A primary object of the present invention is to provide mechanism that is capable of determining such flight variables as hypersonic velocity and angle of attack directly rather than in terms of pressures as in the case of the Pitot tube; and that can operate continuously without damage to the probe and with a minimum of disturbance to the air stream.

That object is accomplished by sensing the detailed position of the shock wave which precedes a vehicle traveling at hypersonic velocity. Angle of attack is typically measured in terms of the angular relation between the shock front and the longitudinal axis of the vehicle. In accordance with one aspect of the invention, that angular relation is determined from the directions or phase relations of radar radiation emitted from a plurality of radar antennas and reflected from spaced positions on the shock front.

A further important aspect of the invention utilizes means for perturbing the position of the shock wave, preferably periodically; and means responsive to the resulting shock wave displacements at a plurality of longitudinally spaced positions on the vehicle. In illustrative form of this aspect of the invention, the shock front is transversely displaced by such means as a periodically varying magnetic field, and the velocity of propagation of that displacement down the shock front is sensed by phase comparison of the radar reflection obtained at axially spaced stations on the vehicle.

A full understanding of the invention and of its further objects and advantages will be had from the following description of certain preferred manners of carrying it out. The particulars of that description and of the accompanying drawings, which form a part of it, are intended as illustration only, and not as a limitation upon the scope of the invention, which is defined in the appended claims.

In the drawings:

FIG. 1 is a schematic axial section representing one illustrative form of the invention;

FIG. 2 is a schematic diagram representing an illustrative radar station in accordance with the invention;

FIG. 3 is a schematic drawing representing illustrative computing means for measuring angle of attack;

FIG. 4 is a schematic drawing representing alternative illustrative computing means;

FIG. 5 is a schematic drawing representing a further illustrative method of measuring angle of attack;

FIG. 6 is a schematic axial section representing a further illustrative form of the invention, adapted for determining vehicle velocity; and FIG. 7 is a schematic drawing representing illustrative computing means for measuring vehicle velocity.

In FIG. 1, the forward portion of a vehicle, typically a missile, is represented at 20, with rounded nose portion 22 which is axially symmetrical about the vehicle axis 21. Vehicle 20 is assumed to be traveling at hypersonic velocity through an atmosphere of small but finite density $\rho$. Under such conditions the vehicle is preceded by a detached shock wave, represented schematically at 30. The thermodynamical properties of the air change sharply across the shock front, as do the electrical and optical properties. The shock wave is approximately axially symmetrical about an axis 31 which is parallel to the direction of travel of the vehicle. Wave axis 31 and vehicle axis 21 intersect at an acute angle $\alpha$, the angle of attack of the vehicle. The precise point of intersection of axes 21 and 31 varies somewhat with detailed conditions, but is approximately at the center of curvature 24 of the vehicle nose.

In accordance with the present invention, electromagnetic radiation is propagated from a plurality of stations at selected positions on the vehicle, and the radiation reflected from the shock front is detected by respective receiving stations. Corresponding sending and receiving stations may utilize the same antenna structure, as is commonly done in radar systems of known type, or separate sending and receiving antennas may be provided. In the illustrative arrangement of FIG. 1, four stations are represented at $S_{a1}$, $S_{a2}$, $S_{b1}$ and $S_{b2}$, each with an antenna 42. Each station includes means for projecting a beam of radiant energy from its antenna and for detecting reflected beam energy.

Stations $S_{a1}$ and $S_{a2}$ are positioned on one side of vehicle axis 21, which will be referred to for clarity of description as the upper side, at respective longitudinal distances $L_1$ and $L_2$ aft of nose center 24, and at respective radii $H_1$ and $H_2$ from axis 21. Those radii typically have the same value H. Stations $S_{b1}$ and $S_{b2}$ are positioned on the opposite, or lower, side of the vehicle, typically symmetrically opposite the respective upper stations. The four stations thus lie in a common axial plane, which is the plane of the paper in FIG. 1. That station plane will be assumed to contain also wave axis 31 and angle $\alpha$. With that illustrative arrangement, upper stations $S_{a1}$ and $S_{a2}$ and lower stations $S_{b1}$ and $S_{b2}$ may be considered to lie in two distinct axial planes which are 180° apart. Additional stations may be provided in other axial planes, for example in the axial plane perpendicular to FIG. 1.

The exact form and position of shock wave 30 depends upon such factors as the atmospheric density $\rho$ in free space surrounding the vehicle, the velocity of sound in that medium, the vehicle velocity V and the form of the vehicle, particularly the radius of curvature $r$ of the extreme nose portion. In general, the shock front is substantially spherical, with radius R, near its extreme leading portion or apex 42, and gradually becomes substantially conical. The region of the shock wave 34 seen perpendicularly from the stations S will be assumed, for clarity of description, to be essentially conical so that its axial section is closely approximated by the tangent 35. That tangent line forms at 36 a definite angle $\beta$ with wave axis 31, typically satisfying Equation 11 below.

The lines 43 represent the paths of radiation emitted from the respective stations S and reflected back from conical portion 34 of the shock front. Each of those paths may be considered to represent a particular ray of a relatively broad radiation pattern, which ray is perpendicular to shock front 34. In practice, however, each antenna typically forms a well defined radiation beam having a beam axis. The station antennas are then preferably rotatably adjustable in their common plane to orient the respective beam axes perpendicular to the shock front, as at 43. Such adjustment permits most effective utilization of the antenna gain; and provides further important advantages to be described. It is usually sufficient to couple together the two antennas on each side of the vehicle with their axes 43 parallel, and adjust them as a unit.

In the block diagram of FIG. 2 a typical antenna 42 is mounted on a support 52 that is rotatable about an axis 53. That rotation is driven by a reversible motor 54 via a speed reduction linkage 55. Motor 54 may be driven under any desired type of control. The radar sending and receiving system, indicated generally at 40, typically comprises conventional frequency generator and amplifier 60, which determine the carrier frequency of the projected radiation; and a pulse timer 62 for keying the intermittent delivery of radiation pulses from 60 to the line 63. Such pulses are transmitted through the TR switch system 64, which may be of conventional type, to antenna 42, and are projected as a radiation beam along antenna axis 43.

A small fraction of the outgoing radiation beam is reflected back to antenna 42 by the shock front 30, due to the sharp discontinuity in the properties of the medium at the wave surface. That reflection may be ascribed primarily to the interface between the non-absorbing region forward of the shock front and the absorbing medium produced downstream from that front by ionization of the molecules of the atmosphere.

The reflected energy received by antenna 42 is transmitted by TR switch system 64 to receiving amplifier 66. That amplifier delivers a video signal via the line 67 to the phase detector 68, which also receives a reference phase signal, as via the line 69 from frequency generator 60. Phase detector 68 may be of conventional type, and produces on the line 70 a signal that represents the phase difference $\phi$ between transmitted and reflected radiation. For example, phase detector 68 may be of the known type which comprises means for amplifying and clipping both the reflected video signal and the reference signal to produce substantially square waves of equal amplitude; means for taking the difference of those waves to produce a series of pulses of alternating polarity, and rectifying and averaging the pulses to produce a direct current or voltage signal that represents phase difference $\phi$.

A video signal is preferably also supplied from amplifier 66 via the line 81 to a homing control device, indicated schematically at 80. Homing system 80 may be of conventional type, and produces on the line 83 a control signal for drive motor 54, such that the motor is caused to drive antenna 42 to the angular position at which the received beam, reflected from shock front 30, has maximum amplitude. In that position, antenna axis 43 intersects the shock front perpendicularly. In the case of a manned vehicle, homing device 80 may merely indicate the amplitude of the reflected video signal, and the operator can then control drive motor 54 manually to maximize that signal.

An angle transducer is represented schematically at 86, driven from motor 54 via a suitable coupling device, indicated at 87. That coupling may be connected directly to antenna mount 52, if preferred. Transducer 86 may comprise a rotary differential transformer, a potentiometer, or any other suitable device that produces at 88 a signal that represents the angular relation between antenna axis 43 and vehicle axis 21. That angle signal is, for example, directly proportional to the angle $\delta$ between axis 43 and a line perependicular to vehicle axis 21, as indicated specifically at $\delta_a$ and $\delta_b$ in FIG. 1.

Apparatus of the type described in connection with FIG. 2 is typically provided for each of the stations S, except that, as already indicated, the antennas of the two upper stations $S_{a1}$ and $S_{b2}$ may be linked together and driven in unison, and the antennas of the two lower stations $S_{b1}$ and $S_{b2}$ also driven in unison. The output signals $\delta$ for the upper and lower antenna pairs will be denoted by $\delta_a$ and $\delta_b$, respectively. The output signals representing the phase differences $\phi$ for the respective stations are typically all different, and will be distinguished by the subscripts of the respective stations.

In accordance with one aspect of the invention, the two angle signals $\delta_a$ and $\delta_b$ are supplied to a device of any suitable type for indicating the difference of two input signals. Such a device is indicated schematically at 90 in FIG. 3. Many different devices of that general type are known, including, for example, differential amplifiers, which are particularly useful for processing direct current signals; transformers, which are useful for taking the difference of alternating current signals; and differential gear structures, which respond to the difference of two shaft positions. Difference device 90 produces an output on line 92 which represents the difference of the two input signals.

It may be seen by inspection of FIG. 1 that upper antenna angle $$\delta_a = \beta + \alpha \quad (1)$$

and lower antenna angle $$\delta_b = \beta - \alpha \quad (2)$$

From (1) and (2)

$$\alpha = (\delta_a - \delta_b)/2 \quad (3)$$

Therefore the signal on line 92 represents $2\alpha$ and provides a direct measure of the angle of attack of the vehicle.

That signal for $\alpha$ may be supplied to a utilization device 94 of any desired type, which may, for example, comprise any desired calculating mechanism, a display device for indicating visually the angle of attack, or automatic control means for actuating control mechanism for the vehicle, such as fins or rocket motors, to maintain a predetermined value of angle of attack.

The invention provides alternative means for obtaining indication of the angle of attack $\alpha$, which are particularly useful if it is preferred not to servo the antenna movement, or if the antenna beams are not sufficiently well defined to provide the desired accuracy of indication. For that purpose, the phase signals $\phi$ from the respective stations may be combined algebraically in any desired manner by means of electrical computing circuits of conventional type. As one example of such computation, the $\phi$ signals from corresponding upper and lower stations, for example $S_{a1}$ and $S_{b1}$, are supplied to a difference device, represented at 100 in FIG. 4. That device may be of any suitable type, as already discussed in connection with device 90, and produces on the line 102 a signal that is typically proportional to the difference $\Delta\phi = \phi_{a1} - \phi_{b1}$. Alternatively, $\Delta\phi$ may be obtained by supplying the reflected video signals from lines 67 to the two stations $S_{a1}$ and $S_{b1}$ directly as input signals to a phase detector of the type already discussed in connection with 68 of FIG. 2. The output signal from that phase detector then represents $\Delta\phi$, provided that a definite phase relation is maintained between the radiation emitted by the two stations. The $\Delta\phi$ signal provides a measure of $\alpha$, and may be supplied to an indicating or control device $94a$.

To derive the relation between $\Delta\phi$ and $\alpha$, it is convenient initially to consider all station antennas to be positioned on vehicle axis 21, with $H=0$. It can then be shown by simple geometry (compare FIG. 1) that the difference $\Delta P$ in path length to wave front 30 from stations $S_{a1}$ and $S_{b1}$ is $$\Delta P = 2 L_1 \cos \beta \sin \alpha \quad (4)$$

The phase difference $\Delta\phi$ corresponding to that path difference is $$\Delta\phi = \frac{2\pi}{\lambda} 2\Delta P = \frac{8\pi L_1 \cos \beta}{\lambda} \sin \alpha \quad (5)$$

where $\lambda$ represents the wavelength corresponding to the carrier frequency of the radar beam. Rewriting (5):

$$\sin \alpha = C_1 \Delta\phi \quad (6)$$

where the constant of proportionality $C_1$ has the value $$C_1 = \frac{\lambda}{8\pi L_1 \cos \beta} \quad (7)$$

For small values of $\alpha$, such as are ordinarily of practical interest, the difference between $\alpha$ and $\sin \alpha$ may be neglected.

If the stations are not on vehicle axis 21, but are spaced oppositely therefrom at equal radial distances H, the value of $C_1$ in Equations 6 and 7 becomes $$C_1' = \frac{\lambda \cos \gamma}{8\pi L_1 \cos (\beta - \gamma)} \qquad (7')$$

where $\gamma$ is the fixed angle subtended by each of the radius vectors H at the center of curvature 24, as indicated in FIG. 1 for station $S_{a1}$. The value of $C_1$ or $C_1'$ can readily be determined with sufficient accuracy for most practical purposes. Small variations may occur in the value of $L_1$, due to dependence of the axis crossing point 24 upon such factors as velocity, air density and angle of attack. However, the effective value of $L_1$ under given conditions can be determined quite closely from suitable calibration measurements. A modified procedure, described below, avoids any dependence upon $L_1$.

The value of $\beta$, the conical angle of the shock wave at the point of reflection, also depends upon such factors as vehicle velocity and atmospheric density. Its value can be estimated sufficiently closely for many purposes. Alternatively, the value of $\beta$ can be measured directly by homing drive of the antennas, such as has already been described. For example, if difference device 90 in FIG. 3 is replaced by an adding mechanism of any suitable type, the signal on line 92 represents the value of $\delta_a + \delta_b$, which equals $2\beta$ from Equations 1 and 2. By supplying that value of $\beta$ to suitable computing means of known type, $\cos \beta$ or $\cos(\beta - \gamma)$ can be derived for evaluation of $C_1$ or $C_1'$. For given beam definition, the percentage error in the resulting value of $\cos \beta$ is typically less than the corresponding error in $\alpha$ that would be obtained by the method of Equation 3 from the difference of $\delta_a$ and $\delta_b$. Under that condition the determination of $\alpha$ from phase measurements using Equation 6 provides enhanced accuracy.

The dependence of $C_1$ in Equations 6 and 7 upon $L_1$, may be completely avoided if desired by utilizing two longitudinally spaced stations on each side of the vehicle, as illustrated in FIGS. 1 and 5. The four reflected video signals from lines 67 of the respective stations are combined by any desired means to provide the double phase difference $$\Delta\Delta\phi = \phi_{a1} - \phi_{b1} - \phi_{a2} + \phi_{b2} \qquad (8)$$

As illustratively shown in FIG. 5, signals representing $\Delta\phi_1$ for stations $S_{a1}$ and $S_{b1}$, obtained typically from line 102 of FIG. 4, and a corresponding signal representing $\Delta\phi_2$ for stations $S_{a2}$ and $S_{b2}$ are supplied to the further difference device 100b, which produces on the line 102b, a signal representing $\Delta\Delta\phi$. That signal may be supplied as a measure of $\alpha$ to any desired indicating, control or computing device 94b.

From relations corresponding to Equations 4 to 7 it may be shown that, for $H=0$, $$\sin \alpha = C_2 \Delta\Delta\phi \qquad (9)$$

where the constant of proportionality $C_2$ has the value $$C_2 = \frac{\lambda}{8\pi L \cos \beta} \qquad (10)$$

where L stands for $L_2 - L_1$ and is independent of the position of point 24.

If all stations are at equal radial distance H from vehicle axis 21, Equations 9 and 10 are not affected. If the radius $H_1$ for stations $S_{a1}$ and $S_{b1}$ and radius $H_2$ for stations $S_{a2}$ and $S_{b2}$ are different, Equation 10 becomes $$C_2' = \frac{\lambda}{8\pi[L \cos \beta + (H_2 - H_1) \sin \beta]} \qquad (10')$$

From (9) and (10) or (10') the angle of attack $\alpha$ can be computed accurately from suitable combination of signals representing $\beta$ and $\Delta\Delta\phi$.

A further important aspect of the invention permits direct determination of the velocity V at which a vehicle of the type described is moving through the atmosphere. FIG. 6 shows schematically an illustrative embodiment of that aspect of the invention. At the nose of vehicle 20 is mounted mechanism of any suitable type for periodically varying the standoff distance of shock wave 30. That mechanism may, for example, comprise means for producing a longitudinal magnetic field which varies in magnitude periodically. Such a field may be produced by mounting a solenoid winding coaxially near the vehicle nose, as indicated schematically at 122, and supplying periodic pulses of electrical power to the winding, as from a suitable power source 124. The magnetic field produced by solenoid winding 122 in the vicinity of the shock front closely approximates the field of a magnetic dipole. Circuit techniques are known for producing current pulses of many different forms in solenoid 122, including, for example, sinusoidal and sawtooth wave forms. For clarity of description, the magnetic field strength B will be assumed to vary sinusoidally with angular frequency $w$. The shock wave perturbation period is then $2\pi/w$.

It is known that presence of a magnetic field, such, for example, as the field of a magnetic dipole near the stagnation point, causes the shock front to move farther forward from the vehicle nose, thus increasing the standoff distance $R-r$. The described sinusoidally varying field from solenoid 122 thus causes periodic perturbation of the standoff distance of the shock wave in the vicinity of its axis 31.

That perturbation is transmitted outward and rearward along the shock front at a finite velocity of propagation U, causing the shock front 30 to assume a wave form as seen in axial selection. The actual shock front at any position relative to the vehicle oscillates back and forth across an equilibrium position, indicated at 30a. At the substantially conical portion 34 of the shock front opposite radar stations S, the slope $\beta$ of the equilibrium shock front 30a is given by $$\sin \beta = v/V \qquad (11)$$

where $v$ represents the velocity of sound in the surrounding medium. In the same region the velocity of propagation U, measured relative to the vehicle, can be expressed $$U = V \cos \beta + v \qquad (12)$$

where $V \cos \beta$ represents the component along the shock front of the convection velocity V of the undisturbed medium relative to the vehicle. From (11) and (12), $$V = U/(\cos \beta + \sin \beta) \qquad (13)$$

Equation 13 may be modified appropriately, if desired, to take account of any lack of precise equality between the sonic velocity normal and tangential to the wave front. In accordance with the present aspect of the invention, the vehicle velocity V is determined from Equation 13 by measuring the propagation velocity U of the shock wave perturbation relative to the vehicle. That measurement may be made in any suitable manner.

A preferred method of measuring U depends upon the fact that the shock wave perturbation causes periodic variaiton of the path length P from each radar station to the shock front, thus modulating the phase difference $\phi$ between emitted and received radar signals. For all stations the frequency of that modulation has the common value $w$; but the modulation phase is different, due to the differences in travel time of the perturbation to the respective stations.

The phase difference $\Phi_a$ of the modulation at the two upper stations $S_{a1}$ and $S_{a2}$, for example, is $$\Phi_a = wT_a = wL \cos (\beta + \alpha)/U \qquad (14)$$

where $T_a$ is the time required for the perturbation to travel the distance $L \cos (\beta + \alpha)$ between the points at which the respective station beams are reflected from shock front 30. From (13) and (14), $$V = wL \cos (\beta + \alpha)/\Phi_a (\cos \beta + \sin \beta) \qquad (15)$$

A corresponding expression for V in terms of $\Phi_b$ for the two lower stations $S_{b1}$ and $S_{b2}$ may be obtained from (15) by replacing cos $(\beta+\alpha)$ by cos $(\beta-\alpha)$.

The phase difference $\Phi$ may be determined in any suitable manner. For example, the signal $\phi_{a1}$ on line 70 (FIG. 2) from station $S_{a1}$ and the corresponding signal $\phi_{a2}$ for station $S_{a2}$ may be supplied to a phase detector 130, as represented schematically in FIG. 7. Those $\phi$ signals typically constitute voltages that are modulated periodically with the common frequency $w$ and in phase with the shock wave perturbation at the respective stations. Phase detector 130, which may be of conventional type, produces on the line 132 a signal representing the phase difference $\Phi_a$ between the modulation of the input signals $\phi_{a1}$ and $\phi_{a2}$.

That signal for $\Phi_a$ may then be supplied to a suitable computing mechanism 136, which also receives information on the other variable quantities $w$, $\alpha$ and $\beta$ in Equation 15, and computes the value of V in accordance with that equation. It has already been described how signals may be produced representing the angles $\alpha$ and $\beta$. From such signals values can be obtained for cos $(\beta \pm \alpha)$, cos $\beta$ and sin $\beta$ by computing means of known type, which may be considered to form a part of computer 136. When the signals for $\alpha$ and $\beta$ are obtained from angles $\delta$ of the emitted and reflected radiation, for example, the angle $\delta$ for each station will typically be modulated at the wave perturbation frequency $w$. However, that perturbation can readily be eliminated by conventional averaging circuits, since the perturbation period is typically short compared to the effective period of actual changes in angles $\beta$ and $\alpha$. If perturbation frequency $w$ is not constant, means of conventional type may be included in power source 124 (FIG. 6) for developing a signal representing $w$ for supply to computer 136, as via the line 141 in FIG. 7. The output from computer 136 on line 138 is then typically a signal representing the vehicle velocity V, which may be supplied to any desired indicating, control or computing mechanism 140.

The described system may, if desired, include servo means for varying the perturbation frequency $w$ in such a way as to hold $\Phi$ at a selected constant value. For example, computer 136 may include comparison means of known type for developing a control signal representing the departure of $\Phi$ from the selected value, that signal being delivered via the line 142 to power source 124. Means of known type are then provided within power source 124 for varying the frequency $w$ in a direction to minimize the control signal. Computer 136 then effectively calculates vehicle velocity V from the input data for $w$, $\beta$ and $\alpha$, phase difference $\Phi$ having a constant value.

As an illustrative practical application of the invention, for velocities of the order of Mach 20 at an altitude of 65,000 meters, a magnetic field strength of approximately 300 gauss at the stagnation point is typically sufficient to modulate the phase difference $\phi$ of a 1 cm. radar carrier wave-length by approximately $w/2\pi$. Under those illustrative conditions a perturbation frequency $2\pi w$ of 1400 cycles per second and an axial spacing L between stations equal to one meter will typically produce a phase difference $\Phi$ approximating $\pi/2$. Those values, however, are intended only for illustration.

The substantial axial symmetry of the shock front produces a strong focusing action of the radar radiation in the plane perpendicular to the paper in FIGS. 1 and 6. That action, which is more effective the closer the stations are to vehicle axis 21, reduces the power requirements for each radar beam and the required beam definition in the described plane.

Many modifications may be made in the particular embodiments that have been described without departing from the proper scope of the invention. For example, radar sending and receiving stations may be positioned, if desired, in two non-parallel axial planes, typically mutually perpendicular, rather than in only one, thus providing information about angle of attack components in those two planes. From such components, the actual angle between vehicle and shock wave axes, as well as its azimuth, may be computed by known computing techniques.

I claim:
1. The method of determining the velocity of a vehicle moving at hypersonic velocity through a gaseous medium; said method comprising perturbing the position of the vehicle shock wave adjacent the axis thereof, and measuring the velocity with which the perturbation is transmitted relative to the vehicle along the shock front.

2. The method of determining the velocity of a vehicle moving at hypersonic velocity through a gaseous medium; said method comprising periodically perturbing the position of the vehicle shock wave adjacent the axis thereof, and measuring the phase difference between the resulting perturbations at respective longitudinally spaced points of the shock wave.

3. In a system for measuring a flight variable of a vehicle moving at hypersonic velocity through a gaseous medium; means for periodically perturbing the position of the vehicle shock wave adjacent the axis thereof, and means for measuring the velocity at which the perturbations are transmitted relative to the vehicle along the shock front.

4. In a system for measuring a flight variable of a vehicle moving at hypersonic velocity through a gaseous medium; means for periodically perturbing the position of the vehicle shock wave adjacent the axis thereof, means for projecting a plurality of beams of electromagnetic radiation toward the shock wave at axially spaced positions thereof, means for detecting beam radiation reflected from the shock wave, means for sensing variations of the reflected radiation caused by the shock wave perturbation, and means for comparing the phase of said variations for the respective positions.

5. In a system for measuring a flight variable of a vehicle moving at hypersonic velocity through a gaseous medium; means for periodically perturbing the position of the vehicle shock wave adjacent the axis thereof, means for projecting a plurality of beams of electromagnetic radiation toward the shock wave at axially spaced positions thereof, means for detecting beam radiation reflected from the shock wave, means responsive to phase differences between the projected and reflected radiation at the respective positions, means for developing respective signals representing variations of said phase differences caused by said wave perturbation, and means responsive to the phase relation of said variations at the respective positions.

6. In a system for measuring the angle of attack of a vehicle moving at hypersonic velocity through a gaseous medium; the combination of means for projecting a plurality of beams of electromagnetic radiation toward the shock wave in respective axial planes angularly spaced by substantially 180°, means for varying the angles of said beams in their respective planes, means for developing signals proportional to the beam angles at which the radiation reflected by the shock wave is a maximum for the respective beams, and means responsive to said signals for computing the difference of said beam angles.

7. In a system for measuring a flight variable of a vehicle moving at hypersonic velocity through a gaseous medium; the combination of means for projecting directed beams of electromagnetic radiation from two axially spaced points of the vehicle toward the shock wave, means for detecting radiation of the respective beams reflected from the shock wave, and means for developing signals that represent the phase differences between the projected and the reflected radiation for the respective beams.

8. In a system for measuring a flight variable of a vehicle moving at hypersonic velocity through a gaseous medium; means for producing a variable megnetic field adjacent the vehicle nose to perturb the vehicle shock wave, and means for detecting the perturbation opposite a point of the vehicle spaced rearwardly from the nose.

9. In a system for measuring a flight variable of a vehicle moving at hypersonic velocity through a gaseous medium; means for periodically perturbing the vehicle shock wave adjacent the vehicle nose, means for detecting the perturbations opposite two axially spaced positions, and means for measuring the phase difference between the perturbations detected by the respective detecting means.

10. In a system for measuring a flight variable of a vehicle moving at hypersonic velocity through a gaseous medium; means for producing a periodically variable magnetic field ahead of the vehicle and having a component parallel to the vehicle axis to cause a periodic variation in the shock wave produced by the vehicle, and means mounted in the vehicle for measuring the velocity with which said variations move relative to the vehicle.

References Cited in the file of this patent

UNITED STATES PATENTS

| | | |
|---|---|---|
| 2,985,018 | Williams | Oct. 22, 1956 |
| 2,937,808 | Newell | May 24, 1960 |
| 3,028,578 | Stanton | Apr. 3, 1962 |

OTHER REFERENCES

Patrick: Magneto-Hydrodynamics of Compressible Fluids, a thesis presented to faculty of Cornell University for Degree of Doctor of Philosophy, June 1956, No. 19,158.

Landshoff: Magnetohydro Dynamics, Stanford Univ. Press, 1957.

Proceedings of the IRE, December, 1961.